United States Patent

Moriguchi et al.

[11] Patent Number: 4,496,988
[45] Date of Patent: Jan. 29, 1985

[54] COPYING MACHINE

[75] Inventors: Haruhiko Moriguchi; Takashi Ohmori, both of Kanagawa, Japan

[73] Assignee: Fuji Xerox Co., Ltd., Tokyo, Japan

[21] Appl. No.: 329,109

[22] Filed: Dec. 9, 1981

[30] Foreign Application Priority Data

Dec. 10, 1980 [JP] Japan ................. 55-174078

[51] Int. Cl.³ .............................................. H04N 1/22
[52] U.S. Cl. ...................................... 358/294; 358/296
[58] Field of Search ............... 358/256, 286, 294, 293, 358/296

[56] References Cited

U.S. PATENT DOCUMENTS 4,300,169  10/1981  Sato ..................................... 358/256

Primary Examiner—Michael A. Masinick
Assistant Examiner—Edward L. Coles
Attorney, Agent, or Firm—Sughrue, Mion, Zinn, Macpeak, and Seas

[57] ABSTRACT

A copying machine body includes only those hardware components which are essential for the physical reading and recording operations, with the electrical control and processing circuitry being disposed in a separate housing.

3 Claims, 1 Drawing Figure

U.S. Patent       Jan. 29, 1985       4,496,988
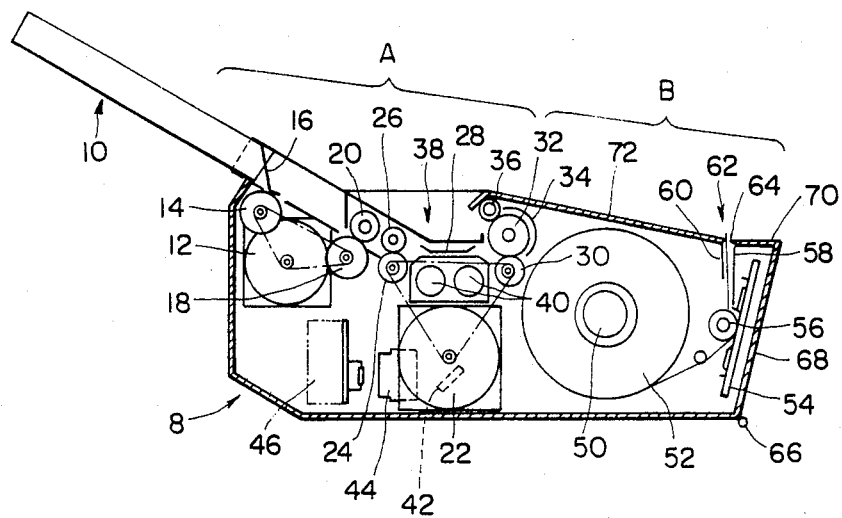

4,496,988

COPYING MACHINE

BACKGROUND OF THE INVENTION

This invention relates to copying machines.

A conventional copying machine is bulky, and therefore if it is necessary to use it on a desk, then a special desk must be provided for it. Thus, the use of conventional copying machines on an ordinary desk is sometimes quite inconvenient.

SUMMARY OF THE INVENTION

Accordingly, this invention is intended to provide a copying machine which is so small that it can be set on the ordinary office desk and can be freely and readily used.

In a copying machine according to the invention, a reading section for reading the image data of an original to be copied and a recording section for reproducing the image data on a recording sheet are incorporated in the body of the copying machine, and a read/record control device for controlling the recording section in response to image data signals from the reading section is provided separately from the copying machine body.

In the copying machine arranged as described above, the copying machine body is made up of only the necessary and minimum number of hardware components: the reading section and the recording section. Therefore, the copying machine is so compact that it occupies only a part of the upper surface of the ordinary office desk. The read/record control device can be set below or beside the desk, so that it may not obstruct other persons.

In one embodiment of the invention, the reading section comprises: an automatic original feeding device; and image sensors which receive light from an original through lenses, to read the image data of the original, and the recording section comprises: means for feeding a recording sheet from a heat-sensitive recording sheet roll; and a heat-sensitive recording head for recording image data on the heat-sensitive recording sheet under control of the read/record control device. Furthermore, the reading section has a turn-over roll and a discharging roll which are used to discharge an original through the upper part of the copying machine after the image data of the original is recorded thereon. The copying machine body has a recording sheet discharging outlet in the upper part thereof, through which a recording sheet on which image data has been reproduced is discharged out of the copying machine body. The copying machine body may have a side panel adjacent to the recording section and an upper panel integral with the side panel, the side panel and the upper panel being opened as one unit to replace the recording sheet roll by a new one. An operating panel may be provided on the top surface of the copying machine body. The copying machine thus arranged is considerably easy to operate and is convenient to use.

BRIEF DESCRIPTION OF THE DRAWING

One example of a copying machine according to this invention will be described with reference to the accompanying drawing, in which the single FIGURE is a sectional view of the body of the copying machine according to the invention.

DETAILED DESCRIPTION OF THE INVENTION

The copying machine body has a housing 8 in which a reading section A for reading the image data of an original and a recording section B for reproducing the image data of an original on a recording sheet are incorporated.

The reading section A has an original supplying tray 10, on which sheet-shaped originals are stacked. The bottom one of the stacked originals is fed between a supply roller 14, driven by an electric motor 12, and a pressing member 16 and is further run between a supply roll 18 driven by the motor 12 and a cooperating roll 20 abutted against the supply roll 18. The original is further run between a feed roll 24 driven by a motor 22 and a pinch roll 26 abutted against the feed roll 24 to a platen 28. These components form an automatic original feeding device.

After passing the platen 28, the original is nipped between a feed roll 30 driven by the motor 22 and a turn-over roll 32 abutted against the feed roll, thus passing therethrough. The original thus passed is run around the turn-over roll 32 with the aid of a turn-over guide 34, thus being turned over. Then, the original is discharged (delivered) to a discharged original receiving tray 38 after passing between the turn-over roll 32 and a discharging roll 36 abutted against the turn-over roll 32.

A fluorescent lamp 40 is disposed below the platen 28, over which an original is moved, to illuminate the original. Light reflected from the original is reflected by a mirror 42 through a plurality of lenses 44 to a plurality of image sensors 46. These lenses 44 and image sensors 46 are arranged in a direction perpendicular to the surface of the drawing, in such a manner that an optical path from the platen through the mirror and the lenses to the image sensors is minimized, and especially such that an optical path from the lenses to the image sensors is minimized.

Image data signals from the image sensors 46 are supplied to a read/record control device (not shown) which is provided separately from the copying machine body. The read/recording control device may be the same as a read/record control device employed in a conventional facsimile transmitter-receiver, and therefore the details of the arrangement and operation thereof will not be described.

The read/record control device operates not only to receive the image data signals from the image sensors 46, but also to control the operations of the motors 12 and 22 and the operation of the recording section B.

The recording section B comprises a heat-sensitive recording sheet roll 52 mounted on a shaft 50; a heat-sensitive recording head 54; a confronting roll 56 adapted to press a recording sheet against the recording head 54; and an electric motor (not shown) for driving the confronting roll 56. The confronting roll drive motor is driven by a control signal from the read/record control device, to turn the confronting roll 56 so that the recording sheet is fed while being abutted against the recording head 54. Simultaneously, the recording head 54 reproduces image data on the recording sheet in accordance with image data signals supplied from the read/record control device.

After the image data have been reproduced on the recording sheet, the recording sheet is passed between discharging guides 58 and 60 and is finally delivered out through a discharging outlet 62 at the top surface of the copying machine body. A cutter edge 64 may be provided at the discharging outlet 62, to cut the recording sheet thus delivered.

In order to replace the heat-sensitive recording sheet roll 52 with a new one in the recording section B, hinge means is provided at a part 66 of the copying machine body. That is, the copying machine body has a side panel 68 and an upper panel 70 integral with the side panel 68 which are opened as one unit to allow the operator to access the heat-sensitive recording head. Alternatively, the copying machine body may be so designed that a main upper panel 72 is opened together with the upper panel 70, or such that a side panel (not shown) provided perpendicularly to the shaft 50 is opened.

In order to improve the operating convenience, an operating panel may be provided on the top surface of the copying machine body. A copying button, a read density changeoverswitch and a stop button may be provided on the operating panel. In the case where the copying machine is so designed as to be applicable to a facsimile or the like by adding a communication function to the read/record control device, a signal transmitting button, a signal receiving button and a communication mode selecting button may also be provided on the operating panel.

As is apparent from the above description, according to the invention, the copying machine body includes only the hardware components necessary for the copying operation, with the control circuitry being located elsewhere. Therefore, the copying machine body is so compact that it occupies only a part of the upper surface of an ordinary office desk. The read/record control device can be set below or beside the office desk, so that it may not create an obstruction.

In the above described copying machine according to this invention, the operation of the various machine components, such as the feed rollers, image sensors, thermal printing device and contorl circuitry for controlling the operation of each of these, are all conventional and well known. The novel feature of this invention resides in the novel packaging and arrangement of the copying machine body and the elimination from the machine body of circuit components such as control circuitry and image signal processing circuitry which need not be located directly at either the read or record station.

What is claimed is:

1. A copying machine of the type comprising a reading section for reading image data from an original at a reading station and generating an image data signal, a recording section for reproducing an image of said original on a recording medium at a recording station in accordance with recording signals, and a read/record control section for receiving said image data signal from said reading section and providing said recording signals to said recording section in accordance with said image data signals, the improvement comprising:
   a copy machine body incorporating therein said reading and recording sections;
   a read/record body portion external of said copy machine body and positionable separately therefrom and containing said read/record control section; and
   wherein said reading section comprises an automatic original feeding device for feeding originals to said reading station, image sensors, at least one lens for receiving light reflected from an original and passing said reflected light to said sensors to read image data of said original, a turn-over roll for receiving an original downstream of said reading station with a first surface of said original facing in a first direction, and a discharging roll which cooperates with said turn-over roll to discharge said original through an upper part of said copying machine with said first surface facing substantially an opposite direction, and wherein said recording section comprises a heat-sensitive recording sheet supply, recording sheet feeding means for feeding said heat-sensitive recording sheet from said supply to said recording station, and a heat-sensitive recording head for reproducing image data on said heat-sensitive recording sheet under control of said recording signals from said read/record control section.

2. A copying machine as claimed in claim 1, characterized in that said copying machine body has a recording sheet discharging outlet in an upper part thereof, and said recording section includes means for discharging a recording sheet on which image data have been reproduced out of said copying machine body through said discharging outlet.

3. A copying machine as claimed in claim 1, characterized in that said copying machine body has a side panel adjacent to said recording section and an upper panel integral with said side panel, said side panel and said upper panel are openable as one unit to expose said recording sheet roll for replacement of said recording sheet roll.

* * * * *